(12) United States Patent
An et al.

(10) Patent No.: US 12,351,504 B2
(45) Date of Patent: Jul. 8, 2025

(54) GLASS PRODUCT MANUFACTURING APPARATUS AND METHOD OF MANUFACTURING GLASS PRODUCT

(71) Applicant: Corning Incorporated, Corning, NY (US)

(72) Inventors: Jang-hun An, Asan-si (KR); Dong-gun Lee, Asan-si (KR); Ho-Soon Lee, Cheonan-si (KR); Seong-kuk Lee, Cheonan-si (KR); Hyun-gyu Park, Asan-si (KR)

(73) Assignee: CORNING INCORPORATED, Corning, NY (US)

( * ) Notice: Subject to any disclaimer, the term of this patent is extended or adjusted under 35 U.S.C. 154(b) by 1005 days.

(21) Appl. No.: 17/253,830

(22) PCT Filed: Jun. 18, 2019

(86) PCT No.: PCT/US2019/037689
§ 371 (c)(1),
(2) Date: Dec. 18, 2020

(87) PCT Pub. No.: WO2019/246067
PCT Pub. Date: Dec. 26, 2019

(65) Prior Publication Data
US 2021/0114913 A1    Apr. 22, 2021

(30) Foreign Application Priority Data

Jun. 22, 2018  (KR) .......................... 10-2018-0071895

(51) Int. Cl.
*C03B 5/00*    (2006.01)
*C03B 5/185*   (2006.01)
(Continued)

(52) U.S. Cl.
CPC ................ *C03B 5/44* (2013.01); *C03B 5/185* (2013.01); *C03B 5/235* (2013.01)

(58) Field of Classification Search
CPC .................................. C03B 5/42; C03B 5/44
See application file for complete search history.

(56) References Cited

U.S. PATENT DOCUMENTS

| 929,899 | A | * | 8/1909 | Thornburg ................ | C03B 5/44 |
| | | | | | 432/156 |
| 2,845,750 | A | * | 8/1958 | Penberthy ................ | C03B 5/44 |
| | | | | | 432/156 |

(Continued)

FOREIGN PATENT DOCUMENTS

| CN | 1081761 A | 2/1994 |
| CN | 1172081 A | 2/1998 |

(Continued)

OTHER PUBLICATIONS

Chinese Patent Application No. 201980048377.5, Office Action, dated Jun. 27, 2022, 16 pages, (8 pages of English Translation and 8 pages of Original Copy); Chinese Patent Office.

(Continued)

*Primary Examiner* — Alison L Hindenlang
*Assistant Examiner* — Andres E. Behrens, Jr.
(74) *Attorney, Agent, or Firm* — Matthew J. Mason

(57) ABSTRACT

A glass product manufacturing apparatus and a method of manufacturing glass products are disclosed. The glass product manufacturing apparatus includes a melting vessel, a support grating configured to support an outer wall of the melting vessel, a cooling module configured to cool the outer wall of the melting vessel, on the support grating, and a support frame detachably fastened to the support grating to limit a movement of the support grating. By using the glass product manufacturing apparatus and the method of manu- (Continued)

facturing glass products, high energy efficiency is maintained even when operating, and a defect rate is reduced.

14 Claims, 6 Drawing Sheets

(51) Int. Cl.
*C03B 5/235* (2006.01)
*C03B 5/44* (2006.01)

(56) References Cited

U.S. PATENT DOCUMENTS

| | | | | |
|---|---|---|---|---|
| 3,437,327 | A * | 4/1969 | Day | C03B 5/44 |
| | | | | 65/346 |
| 3,442,635 | A * | 5/1969 | Javaux | F27D 1/12 |
| | | | | 65/168 |
| 4,491,951 | A | 1/1985 | Dunn | |
| 4,516,934 | A | 5/1985 | Nelson et al. | |
| 4,592,770 | A * | 6/1986 | Pearman | C03B 37/08 |
| | | | | 65/327 |
| 4,816,228 | A * | 3/1989 | Yoshida | C03B 5/43 |
| | | | | 219/649 |
| 5,006,141 | A | 4/1991 | Chen et al. | |
| 5,488,915 | A | 2/1996 | McNeill | |
| 5,536,291 | A | 7/1996 | Sorg et al. | |
| 5,659,564 | A | 8/1997 | Elliott | |
| 6,799,539 | B2 | 10/2004 | Suenaga et al. | |
| 2001/0052246 | A1 | 12/2001 | Kamata | |
| 2006/0144089 | A1 * | 7/2006 | Eichholz | C03B 5/235 |
| | | | | 65/29.21 |
| 2007/0175241 | A1 | 8/2007 | Delamielleure et al. | |
| 2009/0084139 | A1 | 4/2009 | Kobayashi | |
| 2010/0081103 | A1 | 4/2010 | Kobayashi | |
| 2011/0289967 | A1 * | 12/2011 | Burdette | C03B 17/067 |
| | | | | 65/162 |
| 2011/0291310 | A1 | 12/2011 | Calderon et al. | |
| 2012/0216571 | A1 | 8/2012 | Sakamoto et al. | |
| 2012/0297838 | A1 * | 11/2012 | Borsa | C03B 37/0203 |
| | | | | 65/495 |
| 2014/0116095 | A1 * | 5/2014 | Fraley | F27D 1/14 |
| | | | | 65/181 |
| 2014/0208800 | A1 | 7/2014 | McCann et al. | |
| 2015/0321938 | A1 | 11/2015 | McCann et al. | |
| 2015/0336834 | A1 * | 11/2015 | Mobley | C03B 5/44 |
| | | | | 65/347 |
| 2018/0195802 | A1 | 7/2018 | Kobayashi | |
| 2019/0210908 | A1 | 7/2019 | Dannoux et al. | |
| 2020/0115265 | A1 * | 4/2020 | De Angelis | C03B 3/00 |
| 2021/0094863 | A1 * | 4/2021 | Rashley | C03B 5/2356 |

FOREIGN PATENT DOCUMENTS

| | | | |
|---|---|---|---|
| CN | 1300720 | A | 6/2001 |
| CN | 1306945 | A | 8/2001 |
| CN | 101679090 | A | 3/2010 |
| CN | 101808950 | A | 8/2010 |
| CN | 102459101 | A | 5/2012 |
| CN | 102471117 | A | 5/2012 |
| CN | 102906036 | A | 1/2013 |
| CN | 202988958 | U | 6/2013 |
| CN | 103702951 | A | 4/2014 |
| CN | 204298230 | U | 4/2015 |
| CN | 104813103 | A | 7/2015 |
| JP | 52-009899 | Y1 | 3/1977 |
| JP | 57-061636 | A | 4/1982 |
| JP | 58-159497 | U | 10/1983 |
| JP | 60-137835 | A | 7/1985 |
| JP | 60-501809 | A | 10/1985 |
| JP | 62-162891 | A | 7/1987 |
| JP | 04-219324 | A | 8/1992 |
| JP | 05-141868 | A | 6/1993 |
| JP | 2009-007198 | A | 1/2009 |
| JP | 2010-052971 | A | 3/2010 |
| JP | 2013-526477 | A | 6/2013 |
| JP | 2014-025601 | A | 2/2014 |
| JP | 2014-199146 | A | 10/2014 |
| KR | 10-2003-0044541 | A | 6/2003 |
| KR | 10-0635649 | B1 | 10/2006 |
| KR | 10-2010-0097441 | A | 9/2010 |
| KR | 10-2011-0074881 | A | 7/2011 |
| KR | 10-2014-0057280 | A | 5/2014 |
| KR | 10-2014-0066699 | A | 6/2014 |
| WO | 00/00440 | A1 | 1/2000 |
| WO | 2013/013875 | A1 | 1/2013 |
| WO | 2016/102621 | A1 | 6/2016 |
| WO | 2016/102629 | A1 | 6/2016 |
| WO | WO-2016144715 | A2 * | 9/2016 ............... C03B 5/04 |
| WO | 2017/017383 | A2 | 2/2017 |
| WO | 2017/021624 | A1 | 2/2017 |
| WO | 2017/218652 | A1 | 12/2017 |

OTHER PUBLICATIONS

International Search Report and Written Opinion of the International Searching Authority; PCT/US19/037689; Mailed Oct. 15, 2019; 10 Pages; Korean Intellectual Property Office.

Korean Patent Application No. 10-2018-0071895, Office Action dated Jan. 2, 2023, 5 pages (English translation only), Korean Patent Office.

* cited by examiner

GLASS PRODUCT MANUFACTURING APPARATUS AND METHOD OF MANUFACTURING GLASS PRODUCT

BACKGROUND

This application is a National Stage application under 35 U.S.C. § 371 of International Application No. PCT/US2019/037689, filed on Jun. 18, 2019, which claims the benefit of priority to Korean Patent Application Serial No. 10-2018-0071895 filed on Jun. 22, 2018, the contents of which are incorporated herein by reference in their entireties.

The disclosure relates to a glass product manufacturing apparatus and a method of manufacturing glass products, and more particularly, to a glass product manufacturing apparatus and a method of manufacturing glass products, which maintain high energy efficiency even when operating and reduce a defect rate.

SUMMARY

The disclosure relates to a glass product manufacturing apparatus which maintains high energy efficiency even when operating and reduces a defect rate.

The disclosure also relates to a method of manufacturing glass products, which maintains high energy efficiency even when operating and reduces a defect rate.

According to an aspect of the disclosure, a glass product manufacturing apparatus includes a melting vessel, a support grating configured to support an outer wall of the melting vessel, a cooling module configured to cool the outer wall of the melting vessel, on the support grating, and a support frame detachably fastened to the support grating to limit a movement of the support grating.

The support frame may include a beam structure and a support structure extending in a lateral direction from the beam structure to support the support grating, the support structure being detachably fastened to the support grating.

The support frame may include a first support structure and a second support structure, and each of the first support structure and the second support structure may be independently and detachably attached on the support grating.

The cooling module may be configured to be attached to or detached from the support grating while the first support structure is fastened to the support grating and the second support structure is detached from the support grating.

The cooling module may be configured to be detached from or attached to the support grating while the melting vessel is operating.

The cooling module may include a cooling medium inlet, a body part, and a cooling medium outlet, and the body part may include a recessed portion at a position corresponding to at least one of the first support structure and the second support structure.

The beam structure may include a horizontal beam structure extending in a horizontal direction along the outer wall of the melting vessel and a vertical beam structure fastened and fixed to the horizontal beam structure.

The melting vessel may include a gas heating zone and an electric heating zone, the cooling module may be disposed adjacent to the electric heating zone.

The cooling module may cool the outer wall of the melting vessel by a radiation through the support grating.

The cooling module may be provided on a back wall of the melting vessel and may not be provided on another sidewall.

According to another aspect of the disclosure, a glass product manufacturing apparatus includes a melting vessel, a support grating configured to support outer walls of the melting vessel, a cooling module provided on a back wall of the outer walls of the melting vessel, and a support frame detachably fastened and fixed to the support grating, wherein the cooling module is configured to be detachable or attachable while the melting vessel is operating.

The support frame may include a first beam structure and a second beam structure along corresponding outer walls of the melting vessel, a first support structure and a second support structure horizontally extending from the first beam structure and fastened to the support grating, and a third support structure and a fourth support structure horizontally extending from the second beam structure and fastened to the support grating.

At least one of the first support structure, the second support structure, the third support structure, and the fourth support structure may be detachably attached on the support grating.

The cooling module may be disposed between the support grating and the support frame and may be fixed to the support grating.

The cooling module may include a cooling medium inlet, a body part, and a cooling medium outlet, and the body part may include a recessed portion at a position corresponding to at least one of the first support structure, the second support structure, the third support structure, and the fourth support structure.

An area of the back wall overlapping the cooling module may be 40% to 90% of a total area of the back wall.

According to another aspect of the disclosure, a method of manufacturing glass products includes installing a cooling module, which cools an outer wall of a melting vessel, on a back wall of the melting vessel which is operating, wherein the installing of the cooling module includes, while maintaining a fixed state of a first support structure which extends in a lateral direction from a first beam structure and supports a support grating, detaching a second support structure, inserting the cooling module into a space between the support grating and the first beam structure through a space secured by the detachment of the second support structure, fixing the cooling module to the support grating, and fastening the detached second support structure to the support grating.

The first support structure and the second support structure may be vertically arranged.

The first beam structure and a second beam structure extending in parallel with the first beam structure may be fixed to a common beam structure. The second beam structure may include a third support structure and a fourth support structure, which extends in parallel with the first support structure and are fastened to the support grating, and the third support structure and the fourth support structure may maintain a fastened state while the second support structure is being detached.

The cooling module may not be installed on a front wall of the melting vessel.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Figure 1:
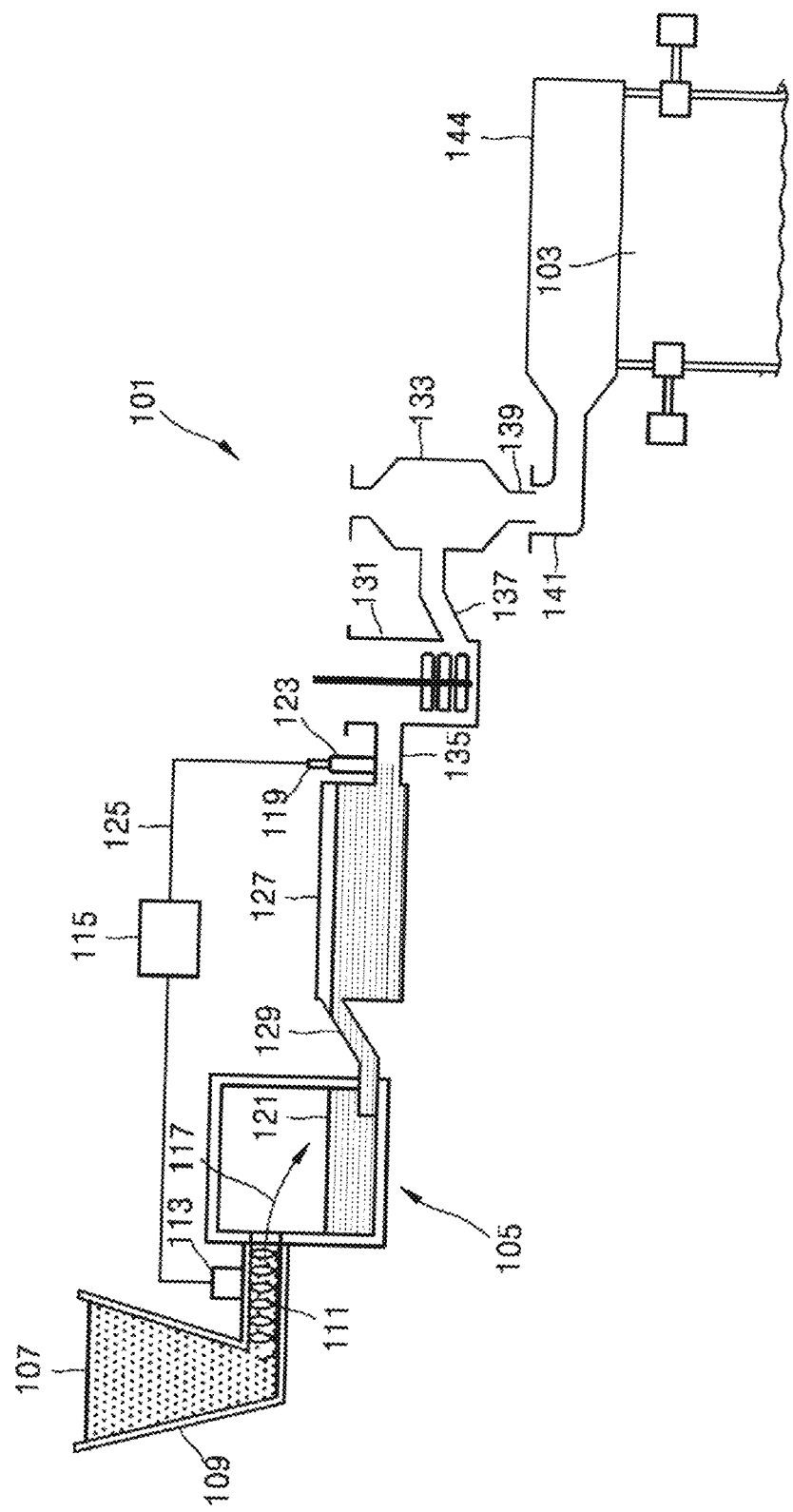
FIG. 1 is a conceptual view illustrating a glass product manufacturing apparatus according to an embodiment of the present disclosure.

The disclosure will now be described more fully with reference to the accompanying drawings, in which exemplary embodiments are shown. The subject matter of the disclosure may, however, be embodied in many different forms and should not be construed as being limited to the exemplary embodiments set forth herein; rather, these embodiments are provided so that this disclosure will convey the subject matter to those skilled in the art. In the drawings, the thicknesses of layers and regions may be exaggerated for clarity. Wherever possible, like reference numerals in the drawings will denote like elements. Therefore, the disclosure is not limited by relative sizes or intervals as shown in the accompanied drawings.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various exemplary embodiments are used to describe exemplary embodiments only, and should not be construed to limit the various additional embodiments. Singular expressions, unless defined otherwise in contexts, include plural expressions. The terms "comprises" or "may comprise" used herein in various exemplary embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

The terms used herein in various exemplary embodiments are used to describe exemplary embodiments only, and should not be construed to limit the various additional embodiments. Singular expressions, unless defined otherwise in contexts, include plural expressions. The terms "comprises" or "may comprise" used herein in various exemplary embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

When a certain embodiment may be implemented differently, a specific process order may be performed differently from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. As used herein, the term "and/or" includes any and all combinations of one or more of the associated listed items.

FIG. 1 illustrates a schematic view of an exemplary glass product manufacturing apparatus 101 according to an embodiment.

Referring to FIG. 1, the glass product manufacturing apparatus 101 can include a melting vessel 105 configured to receive batch material 107 from a storage bin 109. The batch material 107 can be introduced by a batch delivery device 111 powered by a motor 113. An optional controller 115 can be configured to activate the motor 113 to introduce a desired amount of batch material 107 into the melting vessel 105, as indicated by arrow 117. A glass level probe 119 can be used to measure a glass melt 121 level within a standpipe 123 and communicate the measured information to the controller 115 by way of a communication line 125.

The glass product manufacturing apparatus 101 can also include a fining vessel 127, such as a fining tube, located downstream from the melting vessel 105 and coupled to the melting vessel 105 by way of a first connecting tube 129. A mixing vessel 131 such as a stir chamber, can also be located downstream from the fining vessel 127 and a delivery vessel 133, such as a bowl, may be located downstream from the stirring vessel 131. As shown, a second connecting tube 135 can couple the fining vessel 127 to the stirring vessel 131 and a third connecting tube 137 can couple the stirring vessel 131 to the delivery vessel 133. As further illustrated, an exit conduit 139 can be positioned to deliver glass melt 121 from the delivery vessel 133 to an inlet 141 of a forming vessel 144. As shown, the melting vessel 105, fining vessel 127, the mixing vessel 131, delivery vessel 133, and forming vessel 144 are examples of glass melt stations that may be located in series along the glass product manufacturing apparatus 101.

The melting vessel 105 is typically made from a refractory material, such as refractory (e.g. ceramic) brick. The glass product manufacturing apparatus 101 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 129, the fining vessel 127 (e.g., finer tube), the second connecting tube 135, the standpipe 123, the mixing vessel 131 (e.g., a stir chamber), the third connecting tube 137, the delivery vessel 133 (e.g., a bowl), the exit conduit 139 and the inlet 141. The forming vessel 144 is also made from a refractory material and is designed to form the glass ribbon 103.

Figure 2:
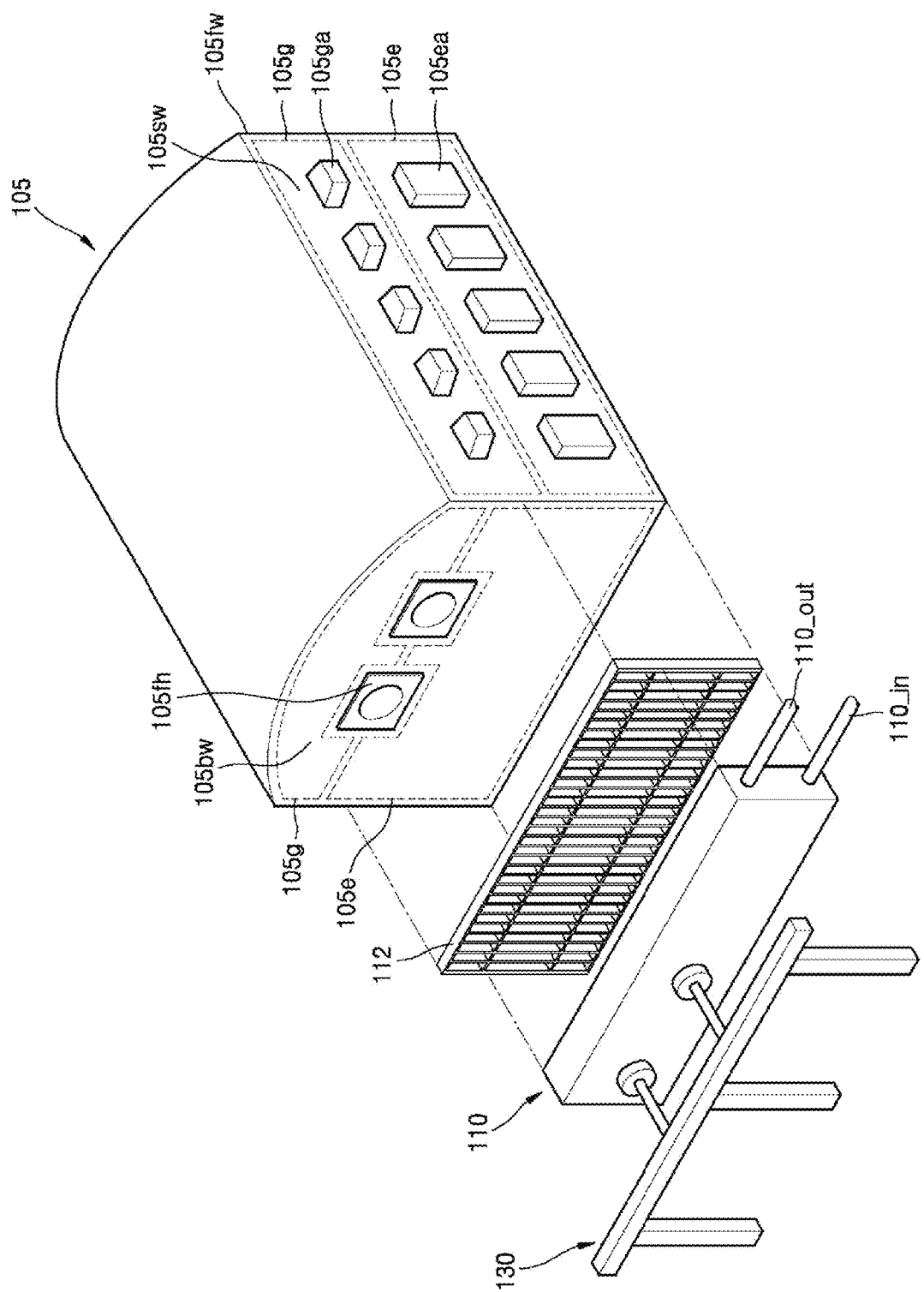
FIG. 2 is an exploded perspective view of the cooling module and the melting vessel according to an embodiment.

FIG. 2 is an exploded perspective view of a cooling module 110 and the melting vessel 105 according to an embodiment.

Referring to FIG. 2, the melting vessel 105 may include a gas heating zone 105g and an electric heating zone 105e. The gas heating zone 105g is generally located above the electric heating zone 105e.

The gas heating zone 105g may supply energy into the melting vessel 105 by using burners 105ga that use gas as a fuel. The electric heating zone 105e may supply energy into the melting vessel 105 by using electrodes 105ea.

The electrodes 105ea may be immersed in the glass melt in the melting vessel 105. In addition, a liquid level of the glass melt in the melting vessel 105 may be located between levels of the burners 105ga and the electrodes 105ea. That is, the burners 105ga may be located higher than the highest level of the glass melt, and the electrodes 105ea may be located lower than the highest level of the glass melt. In some embodiments, the gas heating zone 105g may be located higher than the highest level of the glass melt, and the electric heating zone 105e may be located lower than the highest level of the glass melt.

The electrodes 105ea and the burners 105ga each may be provided on opposite side walls 105sw facing each other of the melting vessel 105.

In addition, the cooling module 110 may be provided on a wall of the melting vessel, for example a back wall 105bw of the melting vessel 105. One or more feed openings 105fh for supplying a raw material of glass melt may be formed in the back wall 105bw of the melting vessel 105. The glass melt generated in the melting vessel 105 may be supplied to processes for manufacturing a glass product through a wall 105fw opposite the back wall 105bw.

The cooling module 110 may be disposed to overlap at least partially with the electric heating zone 105e adjacent thereto. In some embodiments, at least a part of the cooling module 110 may be disposed to overlap with at least a part of the electric heating zone 105e. In some embodiments, the cooling module 110 may be disposed to completely overlap with the electric heating zone 105e. In some embodiments, the cooling module 110 may partially overlap with the electric heating zone 105e and partially overlap with the gas heating zone 105g. Here, 'overlapping' with the electric heating zone 105e may denote that, when an outer circumference of the cooling module 110 is projected onto an external surface of the melting vessel 105, the circumference of the cooling module 110 overlaps with the electric heating zone 105e.

A support grating 112 may be provided between the cooling module 110 and the back wall 105bw. The support grating 112 may support the back wall 105bw. In more detail, a melting glass 121 in the melting vessel 105 may apply a force which pushes a sidewall of the melting vessel 105 in an outward direction. Therefore, the support grating 112 may be provided on the sidewall of the melting vessel 105, for offsetting the force of the melting glass 121. The support grating 112 may be provided on each of sidewalls of the melting vessel 105.

The support grating 112 provides a plurality of openings or holes through which radiant energy emitted from the back wall 105bw passes. If the supporting grating 112 is coupled to a support frame 130 to support the sidewalls of the melting vessel 105, a shape of the support grating 112 is not limited.

The cooling module 110 provided on the support grating 112 may be configured to transfer heat from the melting vessel 105 through conduction, convection, and/or radiation and this will be described in detail later.

The cooling module 110 may use a heat transfer medium fluid for heat exchange. The heat transfer medium fluid may be, for example, water, oil, inert gas, etc., but is not limited thereto. In some embodiments, the heat transfer medium fluid may be water. A temperature of the heat transfer medium fluid rises during passing through the cooling module 110 because the heat transfer medium fluid absorbs heat from the melting vessel 105.

In detail, a difference between temperatures at a first inlet 110_in, through which the heat transfer medium fluid is introduced into the cooling module 110, and a first outlet 110_out, through which the heat transfer medium fluid is discharged from the cooling module 110, may, for example, be about 7 to about 15. For example, the temperature of the heat transfer medium fluid that is introduced through the first inlet 110_in may be about 65 to about 75. In addition, the temperature of the heat transfer medium fluid discharged through the first outlet 110_out may, for example, be about 75 to about 85.

The cooling module 110 may be provided on only the back wall 105bw of the melting vessel 105 and may not be provided on a front wall 105fw of the melting vessel 105. Furthermore, the cooling module 110 may not be provided on two opposite sidewalls 105sw of the melting vessel 105.

Figure 3:
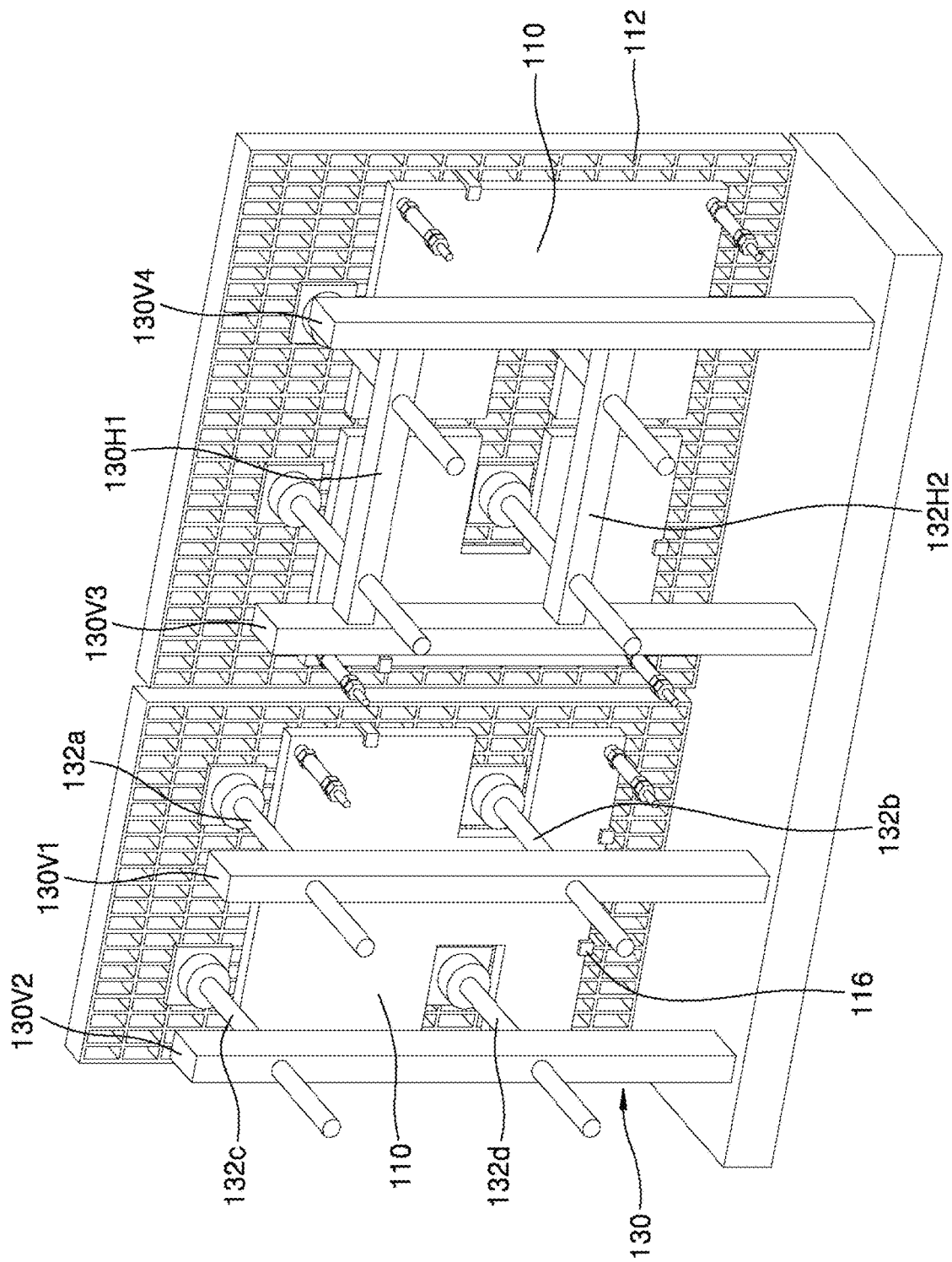
FIG. 3 is a perspective view illustrating a relationship between a support frame, a cooling module, and a support grating according to an embodiment.

FIG. 3 is a perspective view illustrating a relationship between the support frame 130, the cooling module 110, and the support grating 112 according to an embodiment.

Referring to FIG. 3, the support grating 112 may support the back wall 105bw (see FIG. 2) along with the support frame 130.

The support frame 130 may include a plurality of beam structures 130V1, 130V2, 130V3, 130V4, 130H1, and 130H2 and a plurality of support structures 132a to 132d which extend from the beam structures 130V1, 130V2, 130V3, 130V4, 130H1, and 130H2. The plurality of support structures 132a to 132d may extend from the beam structures 130V1, 130V2, 130V3, 130V4, 130H1, and 130H2 in a lateral direction. In some embodiments, the plurality of support structures 132a to 132d may horizontally extend from the beam structures 130V1, 130V2, 130V3, 130V4, 130H1, and 130H2.

In some embodiments, the beam structures 130V1, 130V2, 130V3, 130V4, 130H1, and 130H2 may include a plurality of horizontal beam structures 130H1 and 130H2. In some embodiments, the beam structures 130V1, 130V2, 130V3, 130V4, 130H1, and 130H2 may include a plurality of vertical beam structures 130V1 to 130V4. In some embodiments, the beam structures 130V1, 130V2, 130V3, 130V4, 130H1, and 130H2 may be directly or indirectly connected to one another.

In more detail, the beam structures 130V1, 130V2, 130V3, 130V4, 130H1, and 130H2 may include a first vertical beam structure 130V1, a second vertical beam structure 130V2, a third vertical beam structure 130V3, and a fourth vertical beam structure 130V4. Also, the beam structures 130V1, 130V2, 130V3, 130V4, 130H1, and 130H2 may include a first horizontal beam structure 130H1 and a second horizontal beam structure 130H2. The first horizontal beam structure 130H1 and the second horizontal beam structure 130H2 may extend between the third vertical beam structure 130V3 and the fourth vertical beam structure 130V4 and may be coupled to the third vertical beam structure 130V3 and the fourth vertical beam structure 130V4.

At least one of the support structures 132a to 132d (for example, first to fourth support structures 132a to 132d) may be detachably attached on the support grating 112. This may be achieved when at least one of the support structures 132a to 132d is detachable from the first vertical beam structure 130V1 and the second vertical beam structure 130V2. In some embodiments, each of the support structures 132a to 132d may be independently and detachably attached on the support grating 112.

In FIG. 3, it is illustrated that the first support structure 132a and the second support structure 132b are coupled to the first vertical beam structure 130V1 and the third support structure 132d and the fourth support structure 132d are coupled to the second vertical beam structure 130V2, but the present embodiment is not limited thereto. In some embodiments, the first support structure 132a and the second support structure 132b may be arranged in a vertical direction relative to each other. In some embodiments, the third support structure 132c and the fourth support structure 132d may be arranged in the vertical direction relative to each other.

As illustrated in FIG. 3, the support structures 132a to 132d may support the support grating 112 and may limit a movement of the support grating 112 so that the back wall 105bw is not moved by a force of a melting glass applied to the back wall 105bw.

The cooling module 110 may be detachably fixed to the support grating 112. For example, the cooling module 110 may be detachably fixed to the support grating 112 by a fixing member 116. Since the force of the melting glass is not applied to or is not offset by the cooling module 110, the cooling module 110 may be loosely attached on the support grating 112. In some embodiments, the fixing member 116 may have a fixing coupling force which allows the cooling module 110 not to be separated from the support grating 112 or not to fall down.

For example, the fixing member 116 may be a clamp, but the present embodiment is not limited thereto.

Figure 4A:
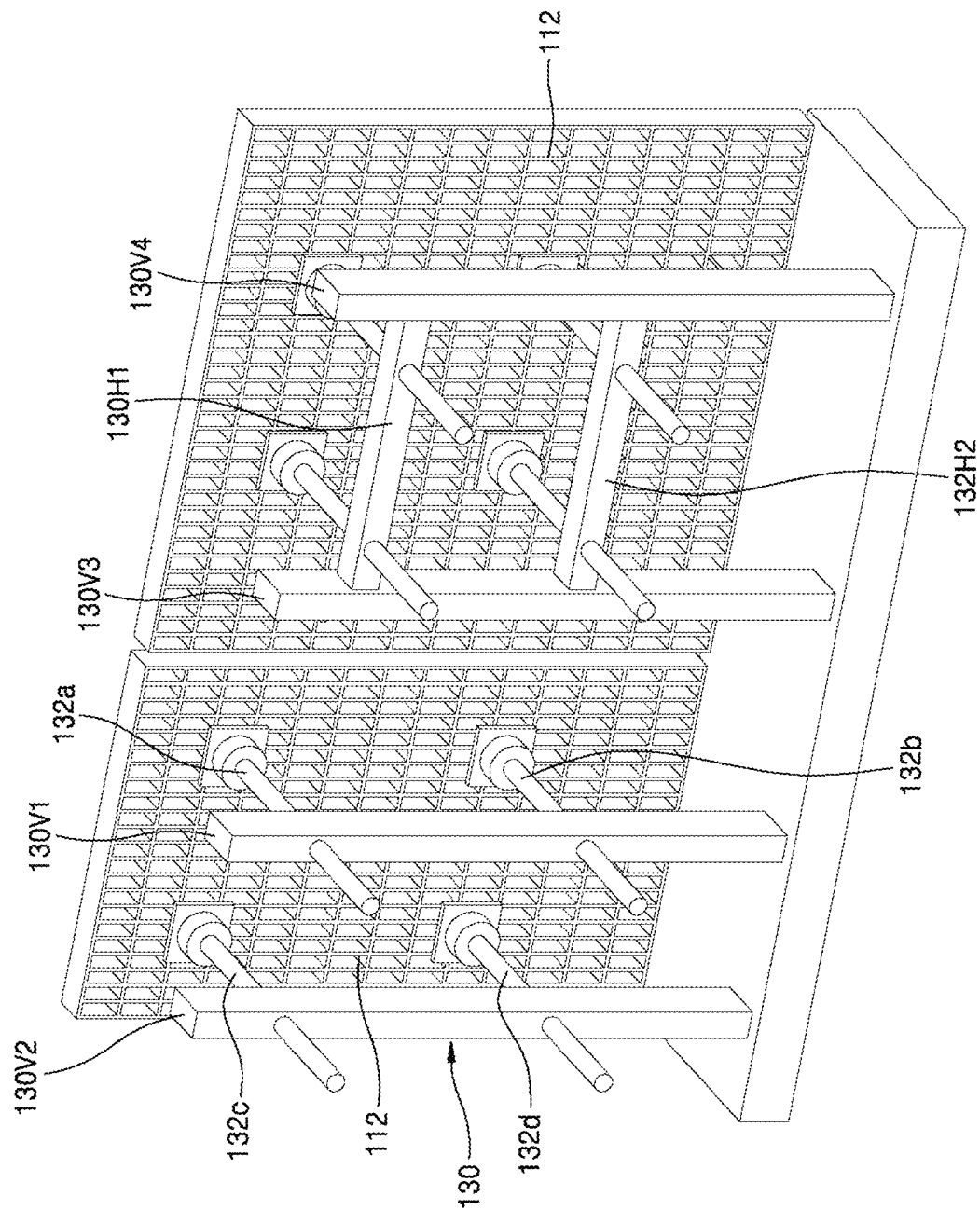
FIGS. 4A and 4B are perspective views illustrating a method of installing a cooling module, according to an embodiment.
Figure 4B:
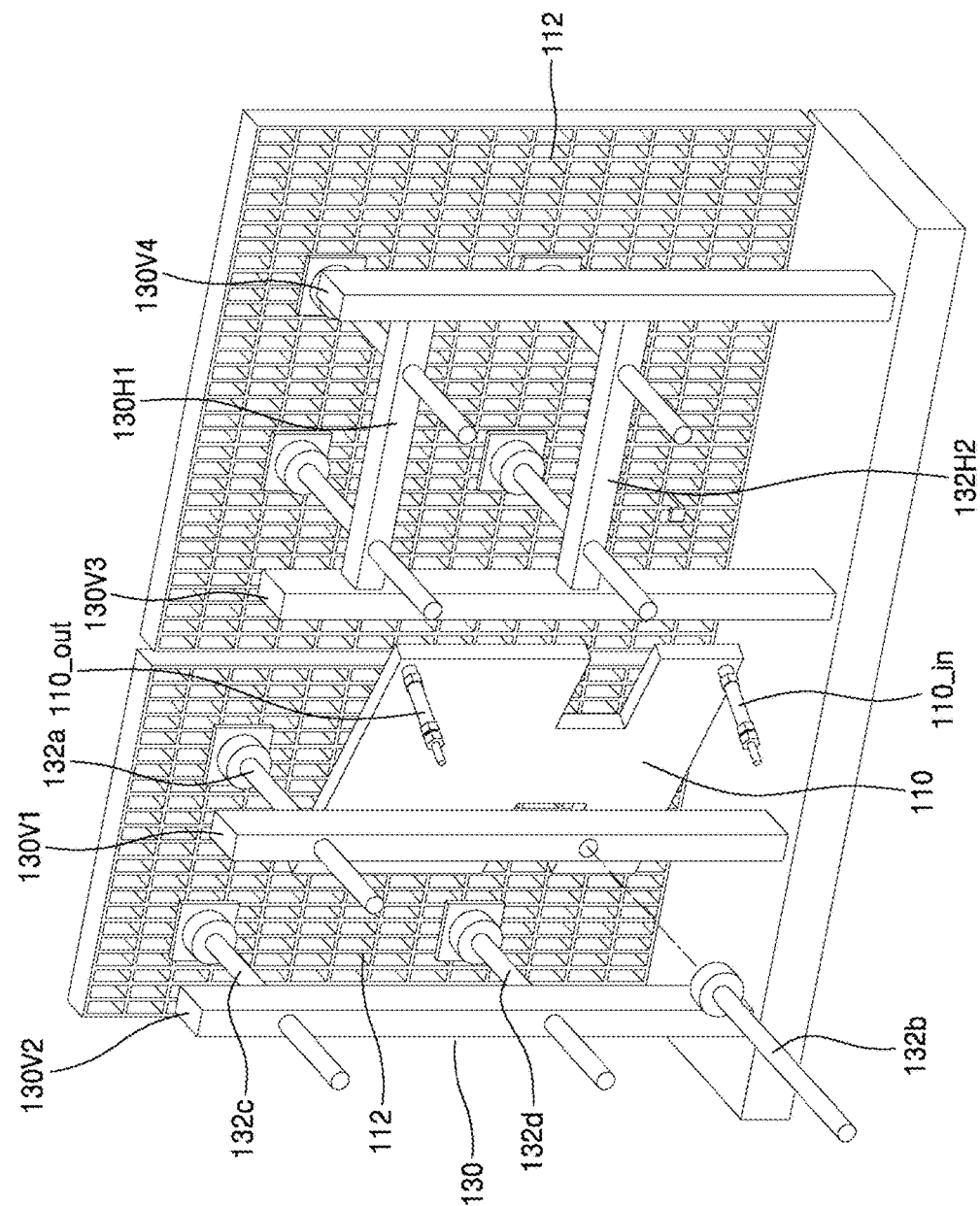

FIGS. 4A and 4B are perspective views illustrating a method of installing a cooling module 110, according to an embodiment.

Referring to FIG. 4A, except for that the cooling module 110 is omitted, the illustration of FIG. 4A is the same as the illustration of FIG. 3, and thus, overlapping description is omitted. However, a melting vessel 105 where the cooling module 110 is to be installed may be operating.

Referring to FIG. 4B, the second support structure 132b may be detached from the support grating 112 while maintaining a fixed state of each of the first support structure 132a, the third support structure 132c, and the fourth support structure 132d. In other words, the second support structure 132b may be detached from the first vertical beam structure 130V1.

Subsequently, the cooling module 110 may be inserted into a space between the support grating 112 and the first beam structure 130V1 through a space (a space, through which the second support structure 132b passes for fastening, between the support grating 112 and the first beam structure 130V1 in FIG. 4B) secured by the detachment of the second support structure 132b.

Subsequently, the cooling module 110 may be fixed to the support grating 112. The cooling module 110 may be fixed to the support grating 112 by the fixing member 116 as described above, but the present embodiment is not limited thereto.

Subsequently, the detached second support structure 132b may be again fastened to the first vertical beam structure 130V1.

While the above-described process is being performed, the melting vessel 105 may be operating.

Figure 5:
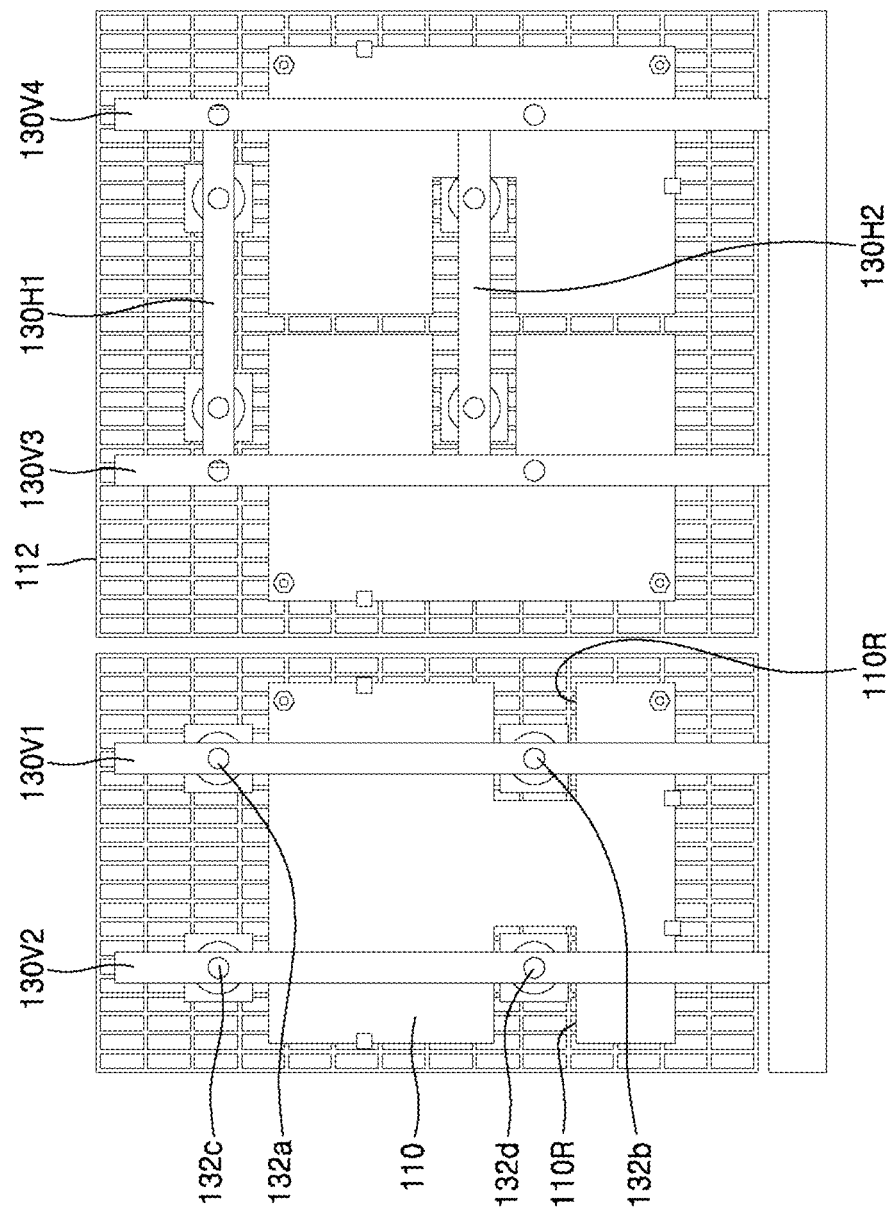
FIG. 5 is a front view illustrating a shape of a cooling module which has been installed while operating, according to an embodiment.

FIG. 5 is a front view illustrating a shape of a cooling module 110 which has been installed while operating, according to an embodiment.

Referring to FIG. 5, the cooling module 110 may include a recessed portion 110R provided at a position corresponding to at least one of the first support structure 132a, the third support structure 132c, and the fourth support structure 132d. Since the recessed portion 110R is provided, a body part of the cooling module 110 may extend up to a vertical direction or a horizontal direction of each of the support structures 132a to 132d or up to a position spaced apart from each of the support structures 132a to 132d. As a result, the cooling module 110 may increase an area overlapping the back wall 105bw.

In some embodiments, an area of the back wall 105bw overlapping the cooling module 110 may be about 40% to about 90% of a total area of the back wall 105bw. For example, when the overlapping area is less than about 40% of the total area of the back wall 105bw, an effect of cooling the back wall 105bw of the melting vessel 105 may be insufficient. On the other hand, when the overlapping area is more than about 90% of the total area of the back wall 105bw, the effect of cooling the back wall 105bw may be saturated and thus may be economically disadvantageous.

A main heat transfer mechanism for cooling the back wall 105bw may be radiation where radiant heat passes through the support grating 112 and is transferred to the cooling module 110. In some embodiments, the cooling module 110 may substantially contact the support grating 112, and thus, heat transfer by convection may not be very active. In some embodiments, an area of the support grating 112 facing the cooling module 110 may not be large due to the plurality of holes provided in the supporting grating 112. As a result, heat transfer by convection between the support grating 112 and the cooling module 110 may not be very active.

For efficient glass melting and defect minimization, it may be useful to selectively cool one or more walls of the melting vessel, for example the back wall, so as to more accurately control the temperature of the melting glass.

By using the glass product manufacturing apparatus and the method of manufacturing glass products according to the embodiments, the cooling module 110 may be installed in the melting vessel 105 of a unit which is operating, without shutting down a glass melting process. Particularly, according to the glass product manufacturing apparatus and the method of manufacturing glass products according to the embodiments, a time taken in installing the cooling module 110 is short, and moreover, any disturbance of glass melting process stability is short.

By using the glass product manufacturing apparatus and the method of manufacturing glass products according to the embodiments, high energy efficiency is maintained even when operating, and a defect rate is reduced.

While the disclosure has been particularly shown and described with reference to embodiments thereof, it will be understood that various changes in form and details may be made therein without departing from the spirit and scope of the following claims.

What is claimed is:

1. A glass product manufacturing apparatus comprising: a melting vessel; a support grating configured to support an outer wall of the melting vessel and offsetting a force of the melting glass pushing on the outer wall, the support grating comprising a plurality of openings through which radiant energy emitted from the outer wall passes; a cooling module attached to, and in contact with, the support grating and configured to cool the outer wall of the melting vessel, the support grating provided between the cooling module and the outer wall, the cooling module comprising: a cooling medium inlet through which a heat transfer medium fluid is received within the cooling module; a cooling medium outlet in fluid communication with the cooling medium inlet, wherein all of the heat transfer medium fluid that exits the cooling module exits through the cooling medium outlet; and a recessed portion defining an opening; and a support frame detachably fastened to the support grating to limit a movement of the support grating, the support frame comprising a beam structure and a support structure, the support structure extending laterally from the beam structure, through the opening of the recessed portion, and to the support grating, wherein the support structure is detachably fastened to the support grating and applies a force to the support grating-, wherein a difference in temperature of the heat transfer medium fluid entering through the cooling medium inlet and exiting through the cooling medium outlet is within a range from about 70 C to about 150 C.

2. The glass product manufacturing apparatus of claim 1, wherein the support frame comprises a first support structure and a second support structure, and each of the first support structure and the second support structure is independently and detachably attached on the support grating.

3. The glass product manufacturing apparatus of claim 2, wherein the cooling module is configured to be attached to or detached from the support grating while the first support structure is fastened to the support grating and the second support structure is detached from the support grating.

4. The glass product manufacturing apparatus of claim 3, wherein the cooling module is configured to be detached from or attached to the support grating while the melting vessel is operating, and wherein the support structure is not in contact with the cooling module while extending through the opening of the recessed portion.

5. The glass product manufacturing apparatus of claim 4, wherein
the cooling medium outlet are located on a rear face of the cooling module that is opposite, and facing away from, the support grating, and wherein an area of the outer wall that is overlapped by the cooling module is within about 40% to about 90% of a total area of the outer wall.

6. The glass product manufacturing apparatus of claim 1, wherein the beam structure comprises: a horizontal beam structure extending in a horizontal direction along the outer wall of the melting vessel; and a vertical beam structure fastened and fixed to the horizontal beam structure.

7. The glass product manufacturing apparatus of claim 1, wherein the melting vessel includes a gas heating zone and an electric heating zone, and the cooling module is disposed adjacent to the electric heating zone.

8. The glass product manufacturing apparatus of claim 1, wherein the cooling module cools the outer wall of the melting vessel by a radiation through the support grating.

9. The glass product manufacturing apparatus of claim 8, wherein the cooling module is provided on a back wall of the melting vessel and is not provided on another sidewall.

10. The glass product manufacturing apparatus of claim 1, wherein the support frame comprises:
a first beam structure and a second beam structure along corresponding outer walls of the melting vessel;
a first support structure and a second support structure horizontally extending from the first beam structure and fastened to the support grating; and
a third support structure and a fourth support structure horizontally extending from the second beam structure and fastened to the support grating.

11. The glass product manufacturing apparatus of claim 10, wherein at least one of the first support structure, the second support structure, the third support structure, and the fourth support structure is detachably attached on the support grating.

12. The glass product manufacturing apparatus of claim 11, wherein the cooling module is disposed between the support grating and the support frame and is fixed to the support grating.

13. The glass product manufacturing apparatus of claim 12, wherein the cooling module comprises a single outlet through which the heat transfer medium fluid exits the cooling module.

14. The glass product manufacturing apparatus of claim 13, further comprising a fixing member that detachably fixes the cooling module to the support grating, and wherein the cooling module is configured to be moved relative to the support grating and the support frame into a space between the support grating and the support frame.

* * * * *